Sept. 4, 1945.        J. V. SKULLEY        2,384,350
METER AND SCALE THEREFOR
Filed Feb. 19, 1942        3 Sheets-Sheet 3
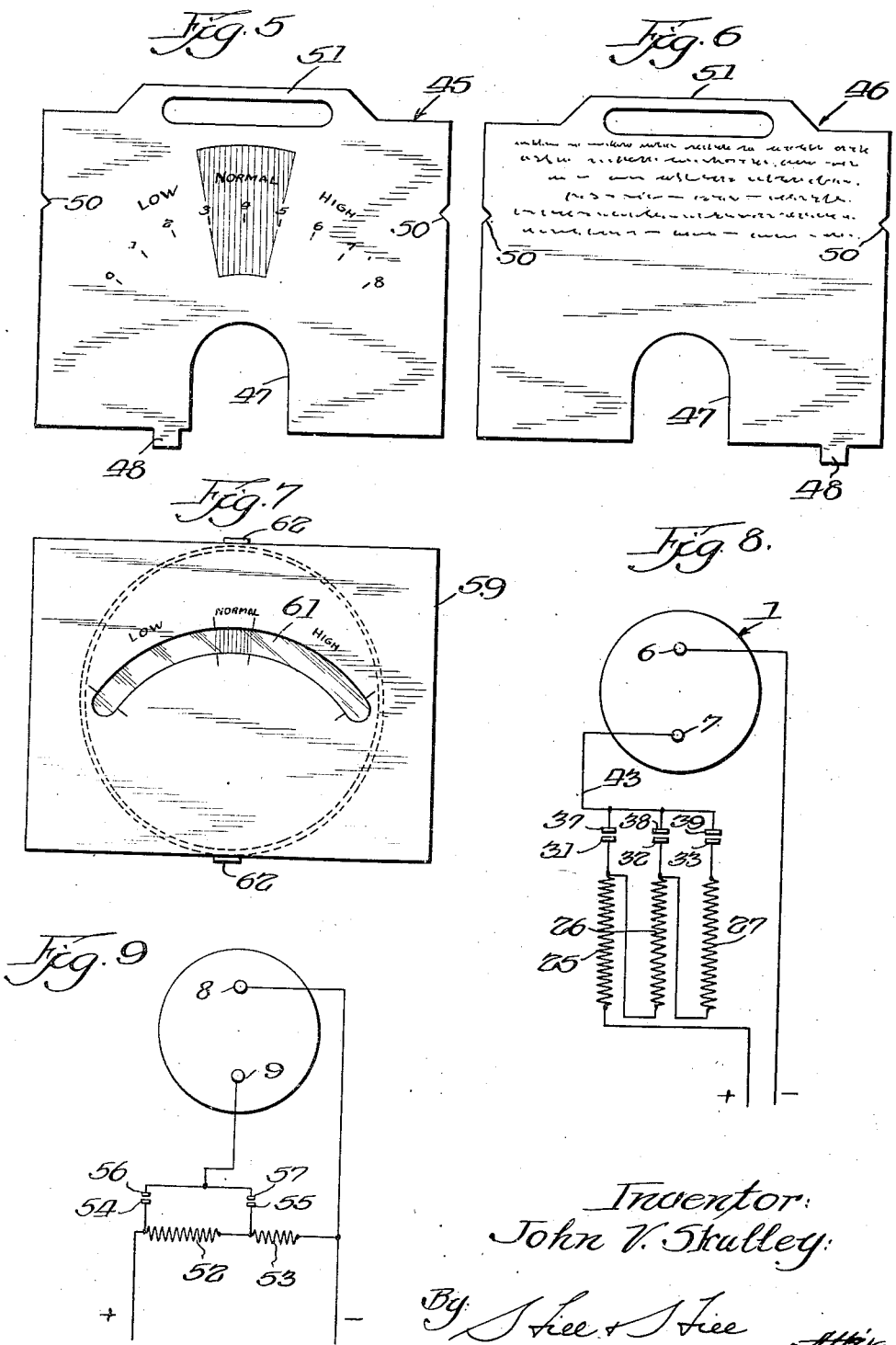

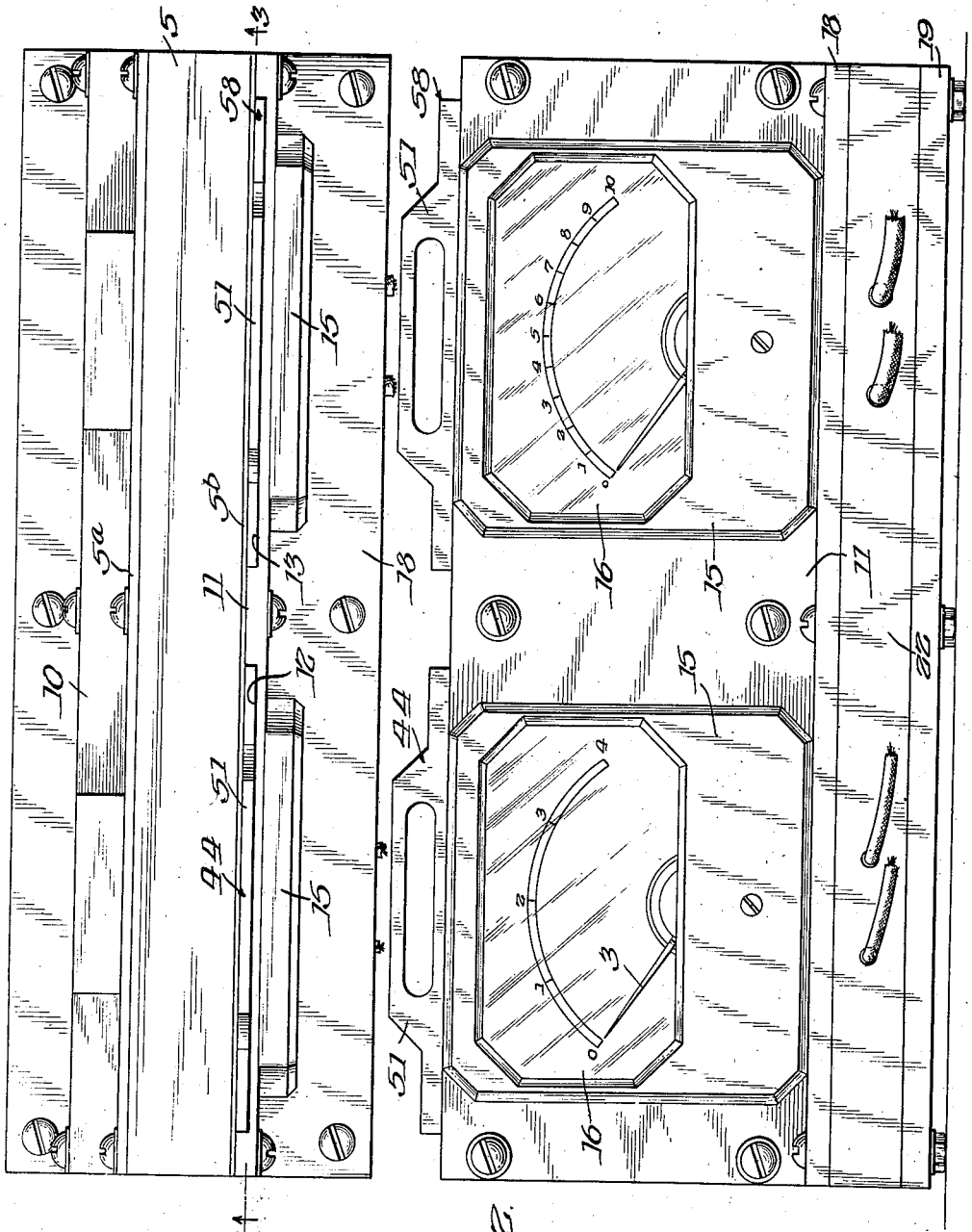

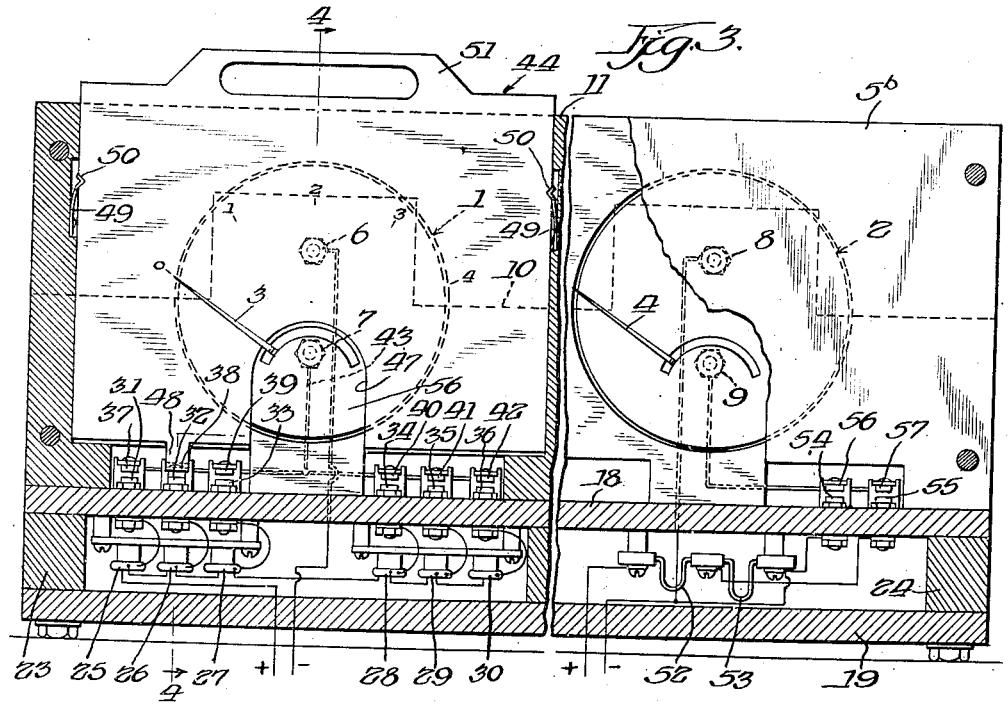
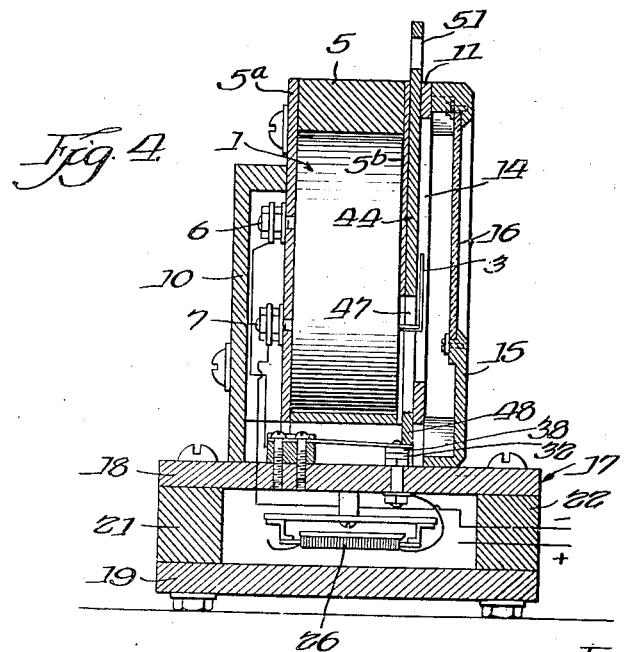

Patented Sept. 4, 1945

2,384,350

UNITED STATES PATENT OFFICE 2,384,350

METER AND SCALE THEREFOR

John V. Skulley, Chicago, Ill.

Application February 19, 1942, Serial No. 431,468

9 Claims. (Cl. 171—95)

The invention relates generally to indicating devices, and more particularly to meters or the like for measuring and testing electrical circuits.

The invention has among its objects the production of such an indicating device wherein separate graduated scales may be provided for various ranges of the instrument, each scale automatically selecting the proper circuit to produce the range indicated on the particular scale utilized.

Another object of the invention is the production of such a device wherein individual scales may be employed for different types of measurements and tests, thereby enabling the use of relatively large scales in conjunction with one instrument, and eliminating the necessity of separate instruments for each measurement, or the use of crowded multiple scales.

A further object of the invention is the production of a scale and instrument which is so designed that even an inexperienced operator may readily make measurements and tests, as well as determine the condition of the particular circuit being tested, this result being facilitated by employing a scale most suitable for the particular measurement, and incorporating sufficient general information relating to such measurement on the back of the scale.

A further object of the invention is the production of such a device which may be applied to present instruments and thereby incorporate some of the advantages of the present invention in such instruments.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings wherein like reference characters indicate like or corresponding parts Fig. 1 is a top plan view of a device embodying the present invention;

Fig. 2 is a front elevational view of the same;

Fig. 3 is a fragmentary sectional view taken approximately on the line 3—3 of Fig. 1;

Fig. 4 is a transverse sectional view taken approximately on the line 4—4 of Fig. 3;

Fig. 5 is a front plan view of the scale utilized with the device illustrated in Figs. 1 to 4;

Fig. 6 is a rear or back plan view of another scale similar to the one illustrated in Fig. 5;

Fig. 7 is a front plan view of a scale adapted to be used on existing instruments;

Fig. 8 is a diagrammatic view of the circuit employed in the volt meter illustrated in Figs. 2 and 3; and Fig. 9 is a similar diagrammatic view of the circuit employed in the ammeter illustrated in Figs. 2 and 3.

There have been numerous devices on the market for measuring and testing electrical circuits, particularly automotive circuits and the like. However in most instances such instruments have embodied separate meters for each measurement to be made or have utilized meters containing multiple graduations on a single scale, the latter resulting in crowded and more or less illegible scales. Likewise, in the case of multiple range instruments embodying a single multiple scale some form of manual switching means must be employed for selecting the various ranges.

In the present invention each series of graduations is on a separate scale member which may be readily removed from the meter or other instrument. Thus, for each range of the instrument a scale member of the most desirable design may be employed. The scale members may contain information on the back of the same pertaining to the measurements or tests to be made with that range of the instrument, together with any other desired information such as directions for making repairs, etc.

The instrument and scale members are so constructed that insertion of the scale member in the instrument will automatically adjust the device for the particular range indicated on that scale, eliminating manual selection of the various ranges.

Referring to the drawings 1 represents generally an indicating unit which in the present instance is illustrated as a volt meter, and 2 indicates generally a second indicating unit illustrated in the present instance as an ammeter, these instruments having indicating needles 3 and 4, respectively. The specific construction of these instruments is not shown or described, as the same comprises no part of the present invention. The units 1 and 2 are supported in a vertically extending block 5 formed to receive the respective units, the latter having terminals 6 and 7 and 8 and 9, respectively. Extending across the rear face of the block 5 is a plate 5a, through which the terminals 6, 7, 8 and 9 extend, the latter, and associated wiring, being concealed by a suitably recessed cover member 10. Extending across the front of the block 5 is a cover plate 5b, having a portion cut away through which the pointers 3 and 4 extend, and a scale supporting member 11 provided with scale receiving channels 12 and 13, the member 11 having an opening 14 adjacent the front of each unit. Suitable cover means 15 is positioned in front of each unit, and is provided with transparent portions 16 through which the respective indicating pointers and scales are visible, the covers 15 being secured to the member 11 by any suitable means such as screws or the like.

The block 5 is mounted on a base portion, indicated generally by the numeral 17, comprising top and bottom members 18 and 19, respectively, spaced by side members 21 and 22 and end members 23 and 24, all of the members being fastened together by screws, as illustrated, or by other suitable means. Carried by the member 17 is a plurality of resistance elements 25 to 30, inclusive, the latter providing means for increasing the range of the volt meter 1. The resistance elements are connected to stationary contacts 31 to 36, inclusive, which are mounted on the upper face of the member 18, and cooperating with the respective stationary contacts are movable spring contacts indicated generally by the numerals 37 to 42, inclusive. The stationary contacts 31 to 36 are connected to corresponding ends of the respective resistances by suitable leads, while the movable contacts are connected in parallel to the contact 7 by a conductor 43.

Cooperating with the indicating units are a plurality of scale members, three scale members 44, 45 and 46 being illustrated in Figs. 3, 5 and 6, respectively, each of the scale members being in the form of a rectangular plate having a cutaway portion 47 to permit free action of the indicating pointers, and may be individually positioned in the channels 12 and 13, respectively. Extending from the lower edge of each of the scale members illustrated, is a projection 48, the latter being of a length to close one of the pairs of contacts when the scale member is positioned in its respective channel. The scales may be held in position by any suitable means such as spring elements 49 engageable with the notches 50 in the respective scales, and to facilitate insertion and removal of the scale members from the instrument, a suitable handle 51 is provided on each member.

It will be apparent that with the scale member 44, the contacts 32—38 will be closed by the engagement of the projection 48 thereof with the spring contact 38. In a similar manner, positioning of the scale member 45 in the channel 12 will close the contacts 33—39 to adjust the range of the volt meter 1 to the corresponding graduations on that scale, and in a similar manner the scale member 46 will close the contacts 31—37. The contacts 34 to 36 and 40 to 42 will be respectively closed when the correct scale members (not shown) are inserted in the channel 12, such scale members being similar to those illustrated with the exception that the projections 48 are on the right half of the scale instead of the left, as illustrated.

The circuit connections for the resistance elements 25, 26 and 27 are diagrammatically illustrated in Fig. 8, which circuit is similar to that of the usual multi-range volt meter, and obviously, the connections for the resistance elements 28 to 30 will be similar to that illustrated for the resistance elements 25 to 27.

It will be apparent that in such a circuit, each pair of contacts places an additional resistor in series with the meter, thereby extending the range of the latter.

The ammeter 2 in the construction illustrated in the drawings is provided with only two ranges, obtained by the use of shunts 52 and 53 supported by the upper member 18 and connected in series as illustrated in Figs. 3 and 9. Stationary contacts 54 and 55 and movable contacts 56 and 57 operatively connect one or both of the shunts in parallel with the ammeter unit 2. The scale member 58 is provided with a projection similar to projections 48 on the volt meter scale members for engaging the proper movable contact, while the scale member for the other range of the instrument would be provided with a similar projection for engaging the other movable contact.

The circuit for the ammeter, of the usual type, is illustrated in Fig. 9, and obviously the ammeter or other instrument employed, could be provided with additional ranges if desired by increasing the number of pairs of contacts and the number of shunt resistors.

As illustrated in Fig. 6, the back of the scale member may contain information regarding the particular range of the instrument obtained by the use of that scale, together with data on tests and measurements to be made with that range, as well as setting forth corrections to be made in the circuits tested to remove defects and the like. For example, if the device was employed in checking automotive ignition circuits, the scale member would contain instructions for making the particular test, as well as correct normal voltages or currents, and set forth how adjustments can be made to correct low or high readings. This construction is very advantageous, as it enables a relatively inexperienced person, after selecting the scale for making a desired test, to obtain the necessary instructions for making such test, determining the condition of the device tested, and adjustments to make if required.

The novel scale construction may also be utilized with present instruments as illustrated in Fig. 7, the scale member 59 having a transparent arcuate portion 61 through which the indicating pointer is visible when the scale is positioned in front of the instrument. The scale member 59 may be secured to the instrument by metal clips 62 or any other suitable means, whereby the scale may be removably positioned on the meter. The scale is graduated for the particular range desired and carries on the back face thereof information such as that just described. Obviously, when such scales are used with present meters, it is necessary to manually select the proper meter range to be used with the individual scale.

It will be apparent from the above description that I have provided an indicating device whereby the various ranges of the instrument may be automatically obtained by inserting the scale desired, which scales are provided with technical data relating to the tests or measurements being made. It might be mentioned that, in the above description of my invention, I have used the terms "scale" and "graduation" broadly and not in a limited numerical sense, the scale graduations taking any desirable form.

It will also be apparent that while I have illustrated the invention in connection with an ammeter and volt meter, the invention may be applied to numerous types of other instruments.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described the combination of an indicating unit having an indicating element, a plurality of bodily removable and interchangeable combined scale and switch actuating members, each having graduations thereon individually cooperable with said indicating element, means for varying the range of said indicating unit including electric switches, one for controlling each separate range and means carried by each of the respective combined scale and switch actuating members for actuating a switch of said range varying means to provide the range corresponding to the respective combined scale and switch actuating members, when any one of the latter is in operative position with respect to the indicating element.

2. In a device of the kind described the combination of an indicating unit, range varying means including a plurality of switches for varying the measuring capacity of said unit, a plurality of bodily removable interchangeable combined scale and switch actuating members individually cooperable with said unit and switches, said members each having graduations thereon for a respective measuring range of said unit, and having an individual switch actuating element thereon related to the individual graduation and engageable with a selected one of the switches of said first mentioned means to actuate such switch and provide the measuring range of said unit corresponding to the graduations on the respective scale employed.

3. In a device of the kind described the combination of an electrical indicating unit, a plurality of resistance elements for varying the measuring capacity of said unit, a plurality of switches for operatively connecting said elements to said unit, a plurality of selectively interchangeable and removable combined scale and switch actuating members individually cooperable with said unit, said members each having graduations thereon for a respective measuring range of said unit, and means carried by each member and related to the individual scale, said means being engageable with one of said switches to actuate the latter and connect the proper resistance necessary to provide the measuring range of said unit corresponding to the graduations on the respective scale employed.

4. In a device of the kind described the combination of an electrical indicating unit, a plurality of resistance elements for varying the measuring capacity of said unit, a plurality of switches for operatively connecting said elements to said unit, a plurality of removable combined scale and switch actuating members individually cooperable with said unit, said members each having graduations thereon for a respective measuring range of said unit, and a projection carried by each member engageable with one of said switches to actuate the latter and provide the measuring range of said unit corresponding to the graduations on the respective scale employed.

5. In a device of the kind described the combination of an indicating unit having an indicating element, a supporting member for said unit having a channel therein adjacent said element, a plurality of interchangeable combined scale and switch actuating members adapted to be individually positioned in said channel, each member having graduations thereon individually cooperable with said indicating element, means for varying the range of said indicating unit, including electric switches, one for each range, and means carried by the respective combined scale and switch actuating members for actuating a switch of said range varying means when the combined scale and switch actuating member is positioned in said channel to provide the range corresponding to the graduations on such scale member.

6. In a device of the kind described the combination of an electrical indicating unit having an indicating element, a supporting member for said unit having a channel therein adjacent said element, a plurality of combined scale and switch actuating members adapted to be individually positioned in said channel, each member having graduations thereon individually cooperable with said indicating element, a plurality of resistance elements for varying the range of said indicating unit, and a plurality of switches for operatively connecting said elements to said unit, each said combined scale and switch actuating member having a switch actuating element thereon for actuating one of said switches when the scale member is positioned in said channel to provide the range corresponding to the graduations on such combined scale and switch actuating member.

7. A member adapted to be positioned across the face of an indicating device having an indicating pointer, said member having a notch extending from an edge thereof through which the pointer extends, said notch permitting free movement of said pointer across the face of said member, the latter having a plurality of graduations thereon cooperable with such pointer, and a projection extending from one of the edges of said member, adapted to engage and actuate a switch of the indicating device.

8. In a testing device having a plurality of test circuits each individually connectible with an indicating member to visibly show the results of each test, the combination of a plurality of switches for closing each individual circuit separately, a plurality of interchangeable switch operating cards, and guide means for removably receiving each of said cards individually to releasably hold the same in operative relation to said switches, each of said cards comprising means for actuating a selected switch, and having calibrations thereon for cooperating with said indicating member to read the direct results of said test as per the selected circuit.

9. In a meter and scale therefor having a plurality of test circuits each individually connectible with an indicating member to visibly show the results of said test, the combination of a plurality of switches for closing each individual circuit separately, a plurality of interchangeable switch operating cards, and guide means for removably receiving each of said cards individually to releasably hold the same in operative relation to said switches, each of said cards having a notch extending upwardly from the lower edge thereof through which the indicating member extends and each of said cards having a projection for actuating a selected switch and having calibrations for cooperating with said indicating member to read the direct results of said test as per the selected circuit.

JOHN V. SKULLEY.